(12) United States Patent
Davis et al.

(10) Patent No.: US 6,602,922 B1
(45) Date of Patent: Aug. 5, 2003

(54) PROCESS FOR PRODUCING $C_{19}$ MINUS FISCHER-TROPSCH PRODUCTS HAVING HIGH OLEFINICITY

(75) Inventors: Burtron H. Davis, Georgetown, KY (US); Stephen J. Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/080,213

(22) Filed: Feb. 19, 2002

(51) Int. Cl.$^7$ ............................ C07C 27/00; C07C 2/02; C07C 2/04
(52) U.S. Cl. ..................... 518/717; 518/715; 518/719; 518/721; 585/502; 585/510; 585/529
(58) Field of Search ................. 518/715, 717, 518/719, 721; 585/502, 510, 529

(56) References Cited

U.S. PATENT DOCUMENTS

| | | |
|---|---|---|
| 4,417,088 A | 11/1983 | Miller |
| 4,639,431 A | 1/1987 | Gates et al. |
| 4,994,428 A | 2/1991 | Bell et al. |
| 5,100,856 A | 3/1992 | Soled et al. |
| 5,135,638 A | 8/1992 | Miller |
| 5,282,958 A | 2/1994 | Santilli et al. |
| 5,500,449 A | 3/1996 | Benham et al. |
| 5,506,272 A | 4/1996 | Benham et al. |
| 5,543,437 A | 8/1996 | Benham et al. |
| 5,866,748 A | 2/1999 | Wittenbrink et al. |
| 6,080,301 A | 6/2000 | Berlowitz et al. |
| 6,090,989 A | 7/2000 | Trewella et al. |

FOREIGN PATENT DOCUMENTS

WO    WO 98/34998    8/1998

OTHER PUBLICATIONS

Miller, S.J., "New Molecular Sieve Process for Lube Dewaxing by Wax Isomerization", Microporous Mat. 2 (1994) 439–449.
Miller, S.J., "Studies on Wax Isomerization for Lubes and Fuels" in *Zeolites and Related Microporous Materials: State of the Art 1994 Studies in Surface Science and Catalysis*, vol. 84 (1994) 2319–2326.
B. Jager et al., "Advances in Low Temperature Fischer–Tropsch Synthesis", Catalysis Today 23 (1995) 17–28.
Miller, S.J., "Wax Isomerization for Improved Lube Oil Quality", $1^{st}$ Intl. Conf. On Refining Processing, AIChE, New Orleans, 1998.

*Primary Examiner*—J. Parsa
(74) *Attorney, Agent, or Firm*—James W. Ambrosius

(57) ABSTRACT

A process for increasing the yield of olefinic products from a Fischer-Tropsch unit and increasing the yield of products within the lube and diesel boiling range by use of a potassium promoted iron-based catalyst.

26 Claims, 3 Drawing Sheets

PROCESS FOR PRODUCING $C_{19}$ MINUS FISCHER-TROPSCH PRODUCTS HAVING HIGH OLEFINICITY

CROSS REFERENCE TO RELATED APPLICATIONS

This application is related to Applicants' patent application titled "Process For The Production Of Highly Branched Fischer-Tropsch Products And Potassium Promoted Iron Catalyst" having the same filing date, the entire contents of which are incorporated herein by reference.

FIELD OF THE INVENTION

The present invention relates to a process for increasing the yield of olefinic products, especially those olefins boiling within the range of diesel, from a slurry-type Fischer-Tropsch unit.

BACKGROUND OF THE INVENTION

The market for lubricating base oils of high paraffinicity is continuing to grow due to the high viscosity index, oxidation stability, and low volatility relative to viscosity of these molecules. The products produced from the Fischer-Tropsch process contain a high proportion of wax which make them ideal candidates for processing into lube base stocks. Accordingly, The hydrocarbon products recovered from the Fischer-Tropsch process have been proposed as feedstocks for preparing high quality lube base oils. See, for example, U.S. Pat. No. 6,080,301 which describes a premium lube base oil having a high non-cyclic isoparaffin content prepared from Fischer-Tropsch waxes by hydroisomerization dewaxing and solvent dewaxing.

As discussed in U.S. Pat. No. 6,090,989, branching present on the molecule has a significant impact on the properties of the lube base stock. The type and position of branching present in the carbon backbone of the molecules is important in determining the properties of the lube base oil product. See S. J. Miller, *Wax Isomerization for Improved lube Oil Quality*, 1 st Intl. Conf. on Refining Processing, AICLE, New Orleans (1998). The ability to increase the molecular branching is not only advantageous for improving the qualities of lube base oils, but also benefits the lighter cuts derived from the Fischer-Tropsch product. For example, branching in Fischer-Tropsch derived jet will improve the freeze point, and branching in Fischer-Tropsch derived diesel is known to improve the pour point. See U.S. Pat. No. 5,506,272. For those Fischer-Tropsch products intended as feed for a hydrocracking operation a further advantage is that the branching renders the molecule easier to crack.

One method for introducing branching into Fischer-Tropsch-derived products is to oligomerize the olefins which are present in the product stream leaving the Fischer-Tropsch reactor. The oligomerization of alpha olefins introduces methyl branching into the carbon backbone. As already noted branching results in desirable lubricating properties. U.S. Pat. No. 4,171,320 teaches a Fisher Tropsch synthesis using a ruthenium catalyst to preferentially produce $C_2$–$C_5$ olefins. U.S. Pat. No. 4,417,088 describes a process for oligomerizing olefins to produce molecules having desirable branching.

The high temperature Fischer-Tropsch process which is carried out in the vapor phase usually will produce lower molecular weight olefinic products within the $C_3$ to $C_8$ range. The olefinic products of the high temperature Fischer-Tropsch process may be sent through oligomerization and hydrogenation steps which will produce a highly branched iso-paraffinic product. A disadvantage of the high temperature Fischer-Tropsch process is the presence in the product of significant amounts of aromatics. If the olefins recovered from the high temperature Fischer-Tropsch products are oligomerized to produce higher boiling range products, these aromatics will be left behind in the unreacted fraction, and their presence will diminish the quality of the lube and fuels. In contrast, the low temperature Fischer-Tropsch process which is conducted in liquid phase will yield higher molecular weight products characterized by low branching, less olefinicity than the high temperature Fischer-Tropsch process, and virtually no aromatics. While the low temperature Fischer-Tropsch process will produce products within the lube base oil boiling range, due to the low level of branching, such products do not possess the desired pour point characteristics. In order to meet these desired values for the products, a catalytic dewaxing operation is usually necessary in order to introduce the proper branching into the molecule. The relatively severe conditions at which the catalytic dewaxing unit must be operated results in a significant yield loss of the higher molecular weight products due to wax cracking. In addition, since the products derived from a low temperature Fischer-Tropsch operation have low olefinicity, a dehydrogenation step is necessary if an oligomerization operation is to be used to increase the yield of higher molecular weight products and introduce additional branching into the products. While a Fischer-Tropsch reaction may be suitably conducted in either a fixed bed reactor, slurry bed reactor, or a fluidized bed reactor, fixed bed reactors and slurry bed reactors are preferred for low temperature Fischer-Tropsch processes. Fluidized bed reactors are preferred for high temperature Fischer-Tropsch processes. Although the low temperature Fischer-Tropsch process is generally considered as being carried out at a temperature between 160 degrees C. and 250 degrees C. while the high temperature Fischer-Tropsch process is usually conducted at temperatures between 250 degrees C. and 375 degrees C., in actuality, the temperature range for the two processes will overlap. A good comparison of the high temperature and low temperature Fischer-Tropsch processes is presented in B. Jager and R. Espinoza, *Advances in Low Temperature Fischer-Tropsch Synthesis*, Catalysts Today 23 (1995) pp. 17–28.

Precipitated iron catalysts promoted with potassium have been described in the literature for use in Fischer-Tropsch synthesis. However, U.S. Pat. No. 4,994,428 teaches that the amount of potassium present should be limited to less than 0.6 weight percent. Higher levels of potassium are taught to offer no benefit in selectivity and to increase the production of undesirable oxygenated by-products. Copper is known to serve as an induction promoter, i.e., reduce the catalytic induction period, in a slurry-type potassium promoted iron catalyst. Copper and potassium promoted iron catalysts have been described in the literature as being selective for alpha olefins. See U.S. Pat. No. 5,100,856. U.S. Pat. No. 4,639,431 describes an iron/zinc Fischer-Tropsch catalyst promoter with copper which is useful for producing olefins.

The present invention utilizes a novel iron-based Fischer-Tropsch catalyst promoted with very high levels of potassium which allow the Fischer-Tropsch unit to produce products having high olefinicity, i.e. a high percent of the total hydrocarbon products will contain double bonds. The present invention is particularly useful for producing high yields of olefins boiling within the range of diesel. In addition, by varying the amount of potassium promoter it is also possible to make higher molecular weight products with increased branching as compared to the conventional low temperature Fischer-Tropsch process. A further advantage of the present invention over conventional high temperature Fischer-Tropsch processes is that the products contain very low levels of aromatics. This invention makes it possible to design an integrated process which maximizes the yield of high value lube base oil or, if desired, maximize the production of high quality transportation fuels, such as diesel and jet. As such, it combines the best features of both the low temperature and high temperature Fischer-Tropsch processes and offers greater flexibility for the plant design and product slate than has hitherto been possible.

As used in this disclosure the words "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrases "consisting of" or "consists of" are intended as a transition meaning the exclusion of all but the recited elements with the exception of only minor traces of impurities.

BRIEF DESCRIPTION OF THE INVENTION

In its broadest aspect, the present invention is directed to a method for increasing the olefinicity of a $C_5$ to $C_{19}$ Fischer-Tropsch product which comprises (a) contacting a synthesis gas feed stock in a slurry-type Fischer-Tropsch reaction zone with a potassium promoted iron catalyst under slurry-type Fischer-Tropsch reaction conditions, wherein the atomic ratio of iron to potassium in the catalyst is within the range of from about 100 atoms of iron to atoms of potassium to about 100 atoms of iron to 15 atoms of potassium and (b) recovering from the Fischer-Tropsch reaction zone a $C_5$ to $C_{19}$ Fischer-Tropsch product having an olefinicity of at least about 60 weight percent. The present invention is further directed to a process for increasing the average molecular weight of the product from a Fischer-Tropsch unit comprising (a) contacting a synthesis gas feed stock in a slurry-type Fischer-Tropsch reaction zone with a potassium promoted iron catalyst under slurry-type Fischer-Tropsch reaction conditions, wherein the atomic ratio of iron to potassium in the catalyst is within the range of from about 100 atoms of iron to 3 atoms of potassium to about 100 atoms of iron to 15 atoms of potassium; (b) recovering from the Fischer-Tropsch reaction zone a $C_5$ to $C_{19}$ Fischer-Tropsch product having an olefinicity of at least about 60 weight percent; and (c) oligomerizing under oligomerization conditions at least a portion of the $C_5$ to $C_{19}$ Fischer-Tropsch product and recovering an oligomerization product from the olgomerization reaction zone having an average molecular weight that is at least 10 percent higher than the $C_5$ to $C_{19}$ Fischer-Tropsch product. The present invention is particularly useful for producing highly olefinic products boiling in the range of naphtha and diesel, and most especially within the boiling range of diesel. Preferably the oligomerization product recovered in step (c) will be a $C_{20}$ plus hydrocarbon.

As used in this disclosure, the term "$C_{19}$ minus Fischer-Tropsch product" refers to a product recovered from a Fischer-Tropsch reaction zone which is predominantly comprised of hydrocarbons having 19 carbon atoms or less in the molecular backbone. One skilled in the art will recognize that such products may actually contain a significant amount of hydrocarbons containing greater than 19 carbon atoms. In general, what is referred to are those hydrocarbons having a boiling range of diesel and below. In general, for the purposes of this disclosure, diesel is considered as having a upper boiling point of about 700 degrees F. (370 degrees C.) and an initial boiling point of about 300 degrees F. (about 150 degrees C.). Diesel may also be referred to as $C_{10}$ to $C_{19}$ hydrocarbons. Likewise, the term "$C_{20}$ plus product" refers to a product comprising primarily hydrocarbons having 20 carbon atoms or more in the backbone of the molecule and having an initial boiling point at the upper end of the boiling range for diesel, i.e., above about 650 degrees F. (340 degrees C.). Such products are often referred to as residuum, which includes both vacuum residuum and atmospheric residuum, since such products will typically make up the bottoms from the distillation column. It should be noted that the upper end of the boiling range for diesel and the lower end of the boiling range for residuum have considerable overlap. The term "naphtha" when used in this disclosure refers to a liquid product having between about $C_5$ to about $C_9$ carbon atoms in the backbone and will have a boiling range generally below that of diesel but wherein the upper end of the boiling range will overlap that of the initial boiling point of diesel. The term "$C_5$ to $C_{19}$ Fischer-Tropsch product" refers to those products boiling within the range of naphtha and diesel. Products recovered from the Fischer synthesis which are normally in the gaseous phase at ambient temperature are referred to as $C_4$ minus product in this disclosure. The precise cut-point selected for each of the products in carrying out the distillation operation will be determined by the product specifications and yields desired.

In order to maximize the production of olefins in the Fischer-Tropsch reactor the atomic ratio of potassium to iron in the Fischer-Tropsch catalyst will preferably fall within the range of from about 100 atoms of iron to 3 atoms of potassium and about 100 atoms of iron to 7 atoms of potassium. In addition, the Fischer-Tropsch catalyst will preferably contain from about 0.1 to about 3 atoms of copper per 100 atoms of iron.

DETAILED DESCRIPTION OF THE INVENTION

Figure 1:
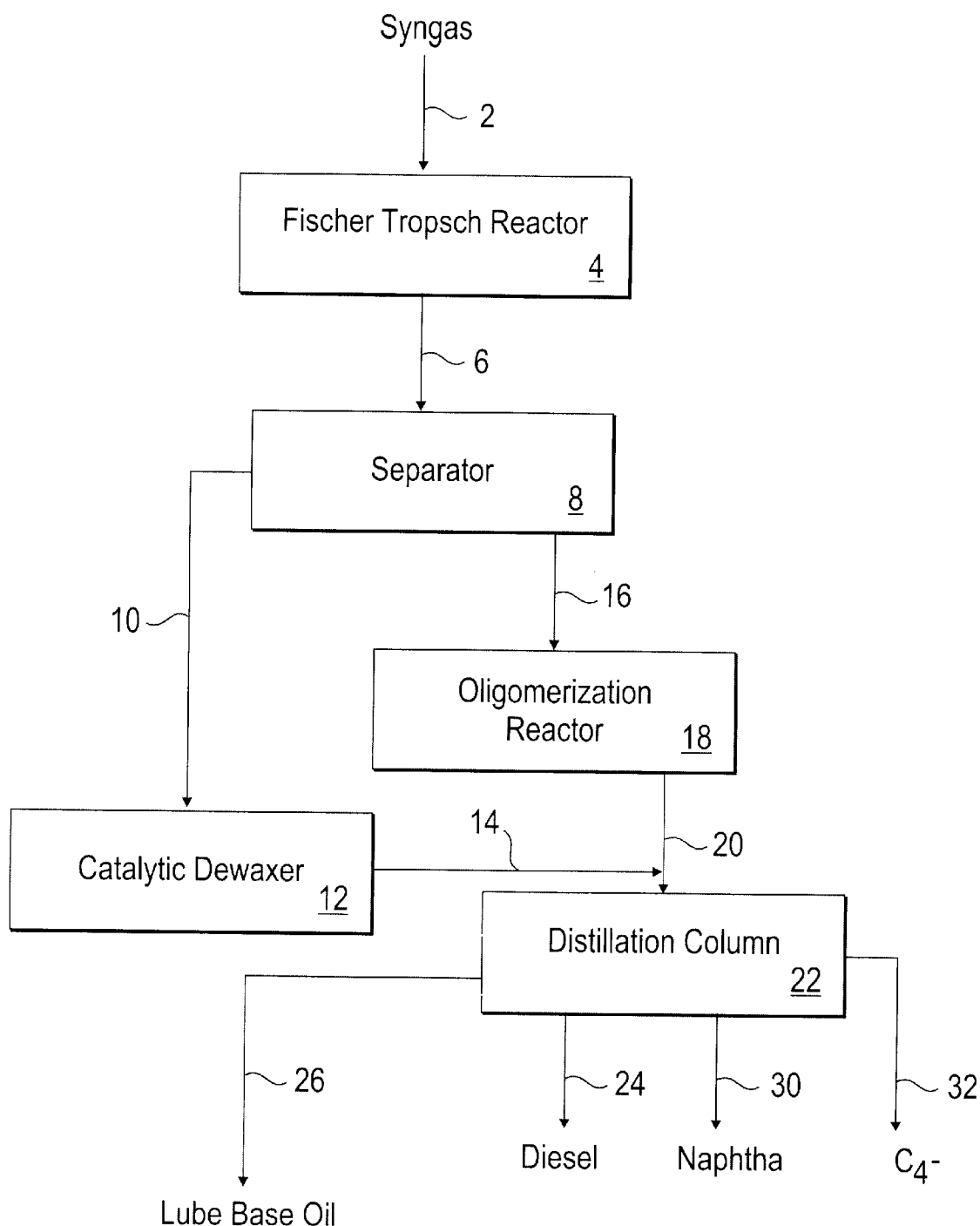
FIG. 1 is a schematic diagram of one embodiment of the present invention which illustrates an integrated process for maximizing the production of diesel and lube base oils.

The present invention will be more clearly understood by reference to FIG. 1 which illustrates one embodiment of the invention. Synthesis gas or syngas which is a mixture comprising carbon monoxide and hydrogen is shown in the drawing as feed stream 2 entering the slurry-type Fischer-Tropsch reactor 4. In the Fischer-Tropsch reactor the syngas is contacted with a iron-based Fischer-Tropsch catalyst promoted with potassium. As will be explained more fully below the atomic ratio of potassium promoter to iron for the Fischer-Tropsch catalyst present in slurry-type Fischer-Tropsch reactor 4 will preferably be within the range of from about 100 atoms of iron to 3 atoms of potassium to about 100 atoms of iron to 7 atoms of potassium in order to maximize the olefinicity of the $C_{19}$ minus product, most especially of those products boiling in the range of diesel. The Fischer-Tropsch product is collected in product stream 6 and sent to separator 8 where the $C_{19}$ minus product is separated from the $C_{20}$ plus product. The $C_{20}$ plus product is collected from the separator 8 in line 10 where it is carried to the catalytic dewaxer 12, preferably a hydroisomerization dewaxing unit. One of the advantages of the present invention is that the $C_{20}$ plus product collected from the Fischer-Tropsch reactor is more highly branched than the $C_{20}$ plus product recovered from a conventional slurry-type Fischer-Tropsch reactor.

Therefore, the catalytic dewaxer may be run at less severe conditions than would be normally be necessary. Consequently less wax cracking will occur and the yield of lube base oils having the desired viscosity characteristics which are recovered via line 14 is increased when compared to the lube yield in a conventional Fischer-Tropsch/hydrodewaxing operation.

Returning to the separator 8, the $C_{19}$ minus product is recovered from the separator by means of line 16. The Fischer-Tropsch reactor in this embodiment is operated to maximize the olefinicity of the $C_5$ to $C_{19}$ Fischer-Tropsch product. Preferably the diesel fraction will have an olefinicity of at least 60 weight percent, i.e., at least 60 weight percent of the $C_5$ to $C_{19}$ Fischer-Tropsch product will contain at least one unsaturated carbon to carbon bond. Preferably the olefinicity of the diesel product will be at least 65 weight percent, and even more preferably the olefinicity will be at least 70 weight percent. The $C_5$ to $C_{19}$ Fischer-Tropsch product is carried by line 16 to the oligomerization reactor 18 where the olefins in the product are oligomerized to form heavier hydrocarbons which also display increased branching along the molecular backbone. Depending on how the process is operated and the desired final product slate, $C_5$ minus hydrocarbons may be included along with the $C_5$ to $C_{19}$ Fischer-Tropsch product. The oligomerization product is carried by conduit 20 to distillation column 22 where the various cuts are separated. Preferably, the majority of the products recovered from the distillation column 22 will be cuts boiling in the diesel and lubricating base oil range. The diesel cut is shown as being collected in product outlet 24, and the product cut boiling in the range of lubricating base oil is shown as being collected in product outlet 26. Lubricating base oil carried by line 14 from the catalytic dewaxer 12 and by conduit 20 from the oligomerization reactor 18 are shown as being mixed together and collected in conduit 20 prior to entering the distillation column 22. Since the lubricating base oil recovered from the oligomerization reactor will contain branching, it is unnecessary to pass it through a catalytic dewaxing operation. Product cuts containing naphtha and $C_4$ minus hydrocarbons are shown as being collected by outlet conduits 30 and 32, respectively. Since the entire process is operated to maximize the heavier product cuts, that is, lubricating base oils and diesel, minimal $C_4$ minus hydrocarbons would be expected to be recovered.

Synthesis Gas Feedstock

Natural gas which may be used to generate the synthesis gas (syngas) used as a feedstock for the Fischer-Tropsch process is an abundant fossil fuel resource. The composition of natural gas at the wellhead varies, but the major hydrocarbon present is methane. For example the methane content of natural gas may vary within the range of from about 40 to 95 volume percent. Other constituents of natural gas may include ethane, propane, butanes, pentane (and heavier hydrocarbons), hydrogen sulfide, carbon dioxide, helium and nitrogen. It is also possible to use methane derived from other sources in the process of the present invention. Methane can be derived from a variety of sources such as the fuel gas system, coal gasification, or even the reduction of methanol.

The synthesis gas used to carry out the present invention can be generated from methane using steam reforming, partial oxidation or gasification, or a combined reforming and autothermal reforming process. All of these reforming processes have been described in the literature and are well known to those skilled in the art. In carrying out the present invention, it is preferred that the ratio of hydrogen to carbon monoxide in the syngas be within the range of from about 0.5 volume percent to about 2.5 volume percent with a range of from about 0.5 volume percent to about 1.0 volume percent being preferred.

Typically, synthesis gas contains hydrogen and carbon monoxide, and may include minor amounts of carbon dioxide and/or water. Common contaminants include sulfur, nitrogen, halogen, selenium, phosphorus and arsenic. It is preferred to remove sulfur and other contaminants from the feed before performing the Fischer-Tropsch chemistry. Means for removing these contaminants are well known to those of skill in the art. For example, ZnO guard beds are preferred for removing sulfur impurities. Sulfur is a poison for most Fischer-Tropsch catalysts, including the catalyst used in the, present invention, and it is preferred that the maximum sulfur content of the syngas not exceed about 0.2 ppm in a commercial Fischer-Tropsch operation.

Fischer-Tropsch Catalyst

The catalyst used to carry out the Fischer-Tropsch reaction in the present invention is a potassium promoted iron-based catalyst. Although potassium promoted iron-based catalysts have been described in the literature for use in slurry-type Fischer-Tropsch reactors, the amount of potassium present in the prior processes is significantly below that used in the Fischer-Tropsch catalyst used in the process of this invention. See, for example, U.S. Pat. No. 4,994,428 where the amount of potassium promoter is limited to no more than 0.6 weight percent in order to prevent the formation of undesirable oxygenates. For the catalyst used in carrying out the Fischer-Tropsch synthesis of the present invention, the atomic ratio of potassium to iron will be within the range of from about 100 atoms of iron to 3 atoms of potassium and about 100 atoms of iron to 15 atoms of potassium and preferably within the range of from about 100 atoms of iron to 3 atoms of potassium and about 100 atoms of iron to 7 atoms of potassium.

As noted above, the $C_{20}$ plus product recovered from the Fischer-Tropsch reactor will have increased branching in comparison to the $C_{20}$ plus product recovered from a conventional low temperature slurry-type reactor. However, in order to maximize the amount of branching in the $C_{20}$ plus product, the optimal atomic ratio of potassium promoter to iron in the catalyst will usually be somewhat higher than the optimal ratio of potassium to iron for maximum olefinicity. This is explained more fully in Applicants' companion application referenced in the section on related applications. In the present invention, it is desired to maximize the olefinicity of the $C_{19}$ minus Fischer-Tropsch products and at the same time also maximize the yield of diesel. Therefore, the atomic ratio of potassium to iron will preferably fall within the range of from about 100 atoms of iron to 3 atoms of potassium and about 100 atoms of iron to 7 atoms of potassium. It is preferred that the catalyst also contain an induction promoter, such as, for example, copper. Copper when used as the induction promoter preferably should be present in an atomic ratio of from about 0.1 to about 3 atoms of copper per 100 atoms of iron. In the preferred composition, the catalyst also will contain between about 1 and about 10 atoms of silicon for each 100 atoms of iron present.

The general means for preparing potassium promoted iron-based Fischer-Tropsch catalysts suitable for use in slurry-type reactors is known to those skilled in the art, and the method of their preparation has been described in the literature. See U.S. Pat. Nos. 5,506,272; 5,100,856; and 4,994,428. In general, a solution is prepared containing the iron and copper, usually through dissolution of the elemental metals in nitric acid to form the corresponding nitrate. A catalyst precursor is formed by the precipitation of the metal oxides from the nitrate solution using an alkali, such as an aqueous solution of ammonium hydroxide. The catalyst precursor is washed and the potassium promoter added, usually in the form of dissolved potassium carbonate. The resulting slurry is spray-dried and calcined. Prior to use, the catalyst is activated in a reducing atmosphere at an elevated temperature. However, the catalyst compositions necessary to carry out the process of the present invention have not been previously described in the literature. The preparation of specific catalyst compositions used to carry out the process of the present invention are described in greater detail in the examples given below.

Fischer-Tropsch Synthesis

The reaction conditions under which the Fischer-Tropsch synthesis is carried out are those of a typical slurry-type operation, as opposed to a fixed bed or a fluidized bed operation. The reaction proceeds in the liquid phase at a temperature within the range of from about 200 degrees C. to about 300 degrees C., preferably between about 210 degrees C. to about 250 degrees C. The reactor pressure will be within the range of from about 100 psig to about 400 psig, with between about 170 psig to about 300 psig being preferred. The catalyst space velocity based upon the amount iron will fall within the range of from about 2 L/gr Fe/hr to about 20 L/gr Fe/hr, with a range of from about 3 L/gr Fe/hr to about 7 L/gr Fe/hr being preferred. While the Fischer-Tropsch operation used to carry out the present invention is sometimes referred to as a low temperature Fischer-Tropsch process, it is preferable to refer to the process as a slurry-type process. Rather than temperature alone being the critical reaction parameter in carrying out the process, it is important that the process be maintained in the liquid phase. Accordingly, the combination of temperature and pressure becomes the critical consideration in performing the operation. The slurry bed reactor behaves as a continuously stirred reactor in which all of the catalyst is exposed to the feed gas.

Carried out according to the limitations presented in this disclosure, excellent chain growth of the hydrocarbon molecules has been observed. Carbon number selectivity or chain growth probability has been expressed in the literature as alpha value. See M.E. Dry, The Fischer-Tropsch Synthesis. Catalysis Science and Technology, Vol. 1 Springer-Verslag (1981). Using this method, alpha values in excess of 0.85 have been observed. In addition, when carried out according to the present invention, the products recovered from the Fischer-Tropsch reactor contain very low oxygenates, typically 5 percent or less, and contained virtually no aromatics.

By employing the process of the present invention, olefinicity in excess of 80 weight percent has been achieved in hydrocarbons within the $C_5$ to $C_{11}$ range and of about 70 percent within the $C_{12}$ to $C_{20}$ range. This is a significant departure from what has been observed in conventional low temperature slurry-type Fischer-Tropsch operations where the products typically have less than 40 weight percent olefinicity. Accordingly, total olefinicity of the $C_5$ to $C_{19}$ Fischer-Tropsch products made by the present process will be at least about 65 weight percent, preferably at least about 70 weight percent, and most preferably at least about 75 weight percent. In addition, excellent yields of both naphtha and diesel have been observed.

Oligomerization

As already noted, the present invention is intended to maximize the production of olefins in the $C_{19}$ minus hydrocarbons, especially among those hydrocarbons having boiling ranges for naphtha and diesel. Prior to oligomerization, it is usually desirable to send the products from the Fischer-Tropsch reactor through a dehydration/guard bed step in order to convert certain oxygenates, mostly alcohols, to olefins, and to remove heteroatoms and water. During oligomerization the lighter olefins are converted into heavier products. The carbon backbone of the oligomers will also display branching at the points of molecular addition. The oligomerization of olefins has been well reported in the literature and a number of commercial processes are available. See, for example, U.S. Pat. Nos. 4,417,088; 4,827,064; 4,827,073; and 4,990,709.

Preferably, the oligomerized product will have an average molecular weight at least 10 percent higher than the initial feedstock, preferably at least 20 percent higher. The oligomerization reaction will proceed over a wide range of conditions. Typical temperatures for carrying out the reaction are between room temperature and 400 degrees F. Other conditions include from 0.1 to 3 LHSV and from 0 to 500 psig. Catalysts for the oligomerization reaction can be virtually any acidic material, such as, for example, zeolites, clays, resins, $BF_3$ complexes, HF, $H_2SO_4$, $AlCl_3$, ionic liquids (preferably ionic liquids containing a Bronsted or Lewis acidic component or a combination of Bronsted and Lewis acid components), transition metal-based catalysts, superacids, and the like. In addition, non-acidic oligomerization catalysts including certain organometallic or transition metal oligomerization catalysts may be used, such as, for example, zirconacenes.

The olefinicity makes it possible to readily upgrade the product slate recovered from the Fischer-Tropsch reactor to higher molecular weight and higher value products, such as high quality lubricating base oils and diesel. In addition, due to the introduction of branching into the molecule the viscosity and pour point properties of the products are enhanced making them excellent candidates for blending components to upgrade lower quality conventional petroleum-derived products to meet market specifications.

Catalytic Dewaxing

Catalytic dewaxing consists of three main classes, conventional hydrodewaxing, complete hydroisomerization dewaxing, and partial hydroisomerization dewaxing. All three classes involve passing a mixture of a waxy hydrocarbon stream and hydrogen over a catalyst that contains an acidic component to convert the normal and slightly branched iso-paraffins in the feed to other non-waxy species, such as lubricating base oil stocks with acceptable pour points. Typical conditions for all classes involve temperatures from about 400 degrees F. to about 800 degrees F. (200 degrees C. to 425 degrees C.), pressures from about 200 psig to 3000 psig, and space velocities from about 0.2 to 5 hr−1. The method selected for dewaxing a feed typically depends on the product quality, and the wax content of the feed, with conventional hydrodewaxing often preferred for low wax content feeds. The method for dewaxing can be effected by the choice of the catalyst. The general subject is reviewed by Avilino Sequeira, in *Lubricant Base Stock and Wax Processing*, Marcel Dekker, Inc. pages 194–223. The determination between conventional hydrodewaxing, complete hydroisomerization dewaxing, and partial hydroisomerization dewaxing can be made by using the n-hexadecane isomerization test as described in U.S. Patent No. 5,282,958. When measured at 96 percent, n-hexadecane conversion using conventional hydrodewaxing catalysts will exhibit a selectivity to isomerized hexadecanes of less than 10 percent, partial hydroisomerization dewaxing catalysts will exhibit a selectivity to isomerized hexadecanes of greater than 10 percent to less than 40 percent, and complete hydroisomerization dewaxing catalysts will exhibit a selectivity to isomerized hexadecanes of greater than or equal to 40 percent, preferably greater than 60 percent, and most preferably greater than 80 percent.

In conventional hydrodewaxing, the pour point is lowered by selectively cracking the wax molecules mostly to smaller paraffins using a conventional hydrodewaxing catalyst, such as, for example ZSM-5. Metals may be added to the catalyst, primarily to reduce fouling. In the present invention conventional hydrodewaxing may be used to increase the yield of lower molecular weight products in the final product slate by cracking the Fischer-Tropsch wax molecules.

Complete hydroisomerization dewaxing typically achieves high conversion levels of wax by isomerization to non-waxy iso-paraffins while at the same time minimizing the conversion by cracking. Since wax conversion can be complete, or at least very high, this process typically does not need to be combined with additional dewaxing processes to produce a lubricating base oil stock with an acceptable pour point. Complete hydroisomerization dewaxing uses a dual-functional catalyst consisting of an acidic component and an active metal component having hydrogenation activity. Both components are required to conduct the isomerization reaction. The acidic component of the catalysts used in complete hydroisomerization preferably include an intermediate pore SAPO, such as SAPO-11, SAPO-31, and SAPO-41, with SAPO-11 being particularly preferred. Intermediate pore zeolites, such as ZSM-22, ZSM-23, and SSZ-32, also may be used in carrying out complete hydroisomerization dewaxing. Typical active metals include molybdenum, nickel, vanadium, cobalt, tungsten, zinc, platinum, and palladium. The metals platinum and palladium are especially preferred as the active metals, with platinum most commonly used.

In partial hydroisomerization dewaxing a portion of the wax is isomerized to iso-paraffins using catalysts that can isomerize paraffins selectively, but only if the conversion of wax is kept to relatively low values (typically below 50 percent). At higher conversions, wax conversion by cracking becomes significant, and yield losses of lubricating base oil stock becomes uneconomical. Like complete hydroisomerization dewaxing, the catalysts used in partial hydroisomerization dewaxing include both an acidic component and a hydrogenation component. The acidic catalyst components useful for partial hydroisomerization dewaxing include amorphous silica aluminas, fluorided alumina, and I2-ring zeolites (such as Beta, Y zeolite, L zeolite). The hydrogenation component of the catalyst is the same as already discussed with complete hydroisomerization dewaxing. Because the wax conversion is incomplete, partial hydroisomerization dewaxing must be supplemented with an additional dewaxing technique, typically solvent dewaxing, complete hydroisomerization dewaxing, or conventional hydrodewaxing in order to produce a lubricating base oil stock with an acceptable pour point (below about +10 degrees F. or −12 degrees C.).

In preparing those catalysts containing a non-zeolitic molecular sieve and having an hydrogenation component for use in the present invention, it is usually preferred that the metal be deposited on the catalyst using a non-aqueous method. Catalysts, particularly catalysts containing SAPO's, on which the metal has been deposited using a non-aqueous method have shown greater selectivity and activity than those catalysts which have used an aqueous method to deposit the active metal. The non-aqueous deposition of active metals on non-zeolitic molecular sieves is taught in U.S. Pat. No. 5,939,349. In general, the process involves dissolving a compound of the active metal in a non-aqueous, non-reactive solvent and depositing it on the molecular sieve by ion exchange or impregnation.

For the purposes of the present invention, hydroisomerization dewaxing, especially complete hydroisomerization dewaxing, is preferred over hydrodewaxing if such operation is able to provide the desired viscosity and pour point specifications for the product. This is because with less wax cracking, the yield of lubricating base oil will be increased. The preferred hydroisomerization catalyst for use in the catalytic hydroisomerization step comprises SAPO-11.

The following examples will further clarify the invention, however, they are not intended to be a limitation upon the scope of the invention.

EXAMPLES

Example 1

Figure 2:
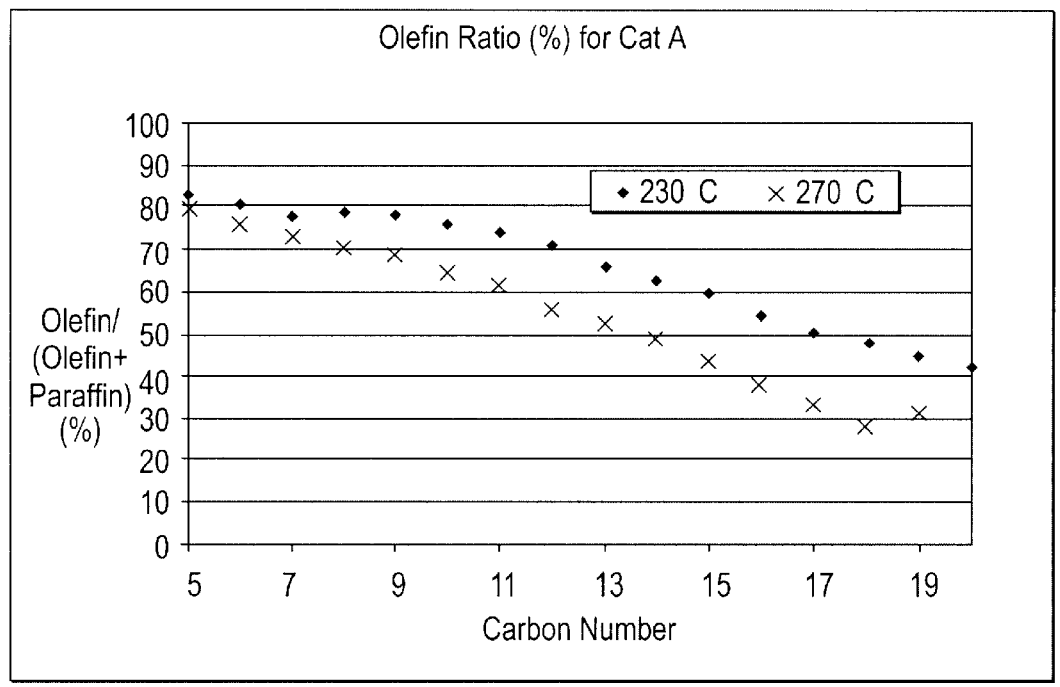
FIG. 2 is a graph illustrating the effect of temperature on olefinity when the Fischer-Tropsch synthesis is carried out according to the invention.

A catalyst (labeled Cat A) was prepared by mixing an aqueous solution containing iron nitrate and tetraethyl orthosilicate (atomic ratio Fe:Si=100:4.6) and concentrated ammonium hydroxide in a continuous stirred tank reactor so that the average residence time was about 6 minutes at a pH of about 9.0. The precipitate was collected by filtration and wash two times with distilled water. The washed solid was dried at 110 degrees C. in air and then calcined in air at 350 degrees C. for 4 hr. To prepare the catalyst for the preparation of highly olefinic products, the solid was impregnated with an aqueous solution of potassium carbonate and copper nitrate to provide a final catalyst containing the atomic ratio of Fe:Si:K:Cu=100:4.6:5.0:2.0 and then dried at 110 degrees C. in air. A slurry was prepared in a CSTR autoclave using 32 g catalyst and 310 g of a $C_{30}$ oil obtained from Ethyl Corp. The catalyst was activated by heating the slurry to 110 degrees C. in helium for 4 hours and then ramping at 10°/minute to 270 degrees C. in flowing CO and held at this temperature for 20 hours. Following activation the pressure was increased to 450 psig and the flows adjusted to give a ratio of $H_2/CO$=1.7 and a total flow rate of 22 normal liters/hour/gram iron. The reaction temperature was 230 degrees C. Samples were collected at intervals and analyzed using gas chromatography. Yield data is shown in Table I. Olefinicity as a function of carbon number in the $C_5$–$C_{20}$ range, as calculated from gas chromatography, is shown in FIG. 2.

TABLE I

| Cat A | 450 psig, 230° C. | | SV = 22 sl/h/g-Fe | H2:CO = 1.7 |
|---|---|---|---|---|
| Sample | A | B | C | average |
| $C_1$ | 6.63 | 6.25 | 5.70 | 6.2 |
| $C_2$ to $C_4$ | 34.01 | 30.92 | 28.50 | 31.1 |
| $C_5$ to $C_{11}$ | 32.08 | 39.99 | 40.20 | 37.4 |
| $C_{12}$ to $C_{18}$ | 22.73 | 20.24 | 22.20 | 21.7 |
| $C_{19+}$ | 4.55 | 2.61 | 3.40 | 3.5 |
| | | | Sum | 100.00 |

Yields (Wt %) in FT Synthesis

Example 2

The catalyst of Example 1 was run at the same conditions as in Example 1, except for a temperature of 270 degrees C. instead of 230 degrees C. FIG. 2 compares product olefinicity in the $C_5$–$C_{20}$ range achieved under the conditions of Example 1 and Example 2. Note particularly the lower olefinicity obtained at the higher temperature.

Example 3

A similar catalyst (labeled Cat B) to that of Example 1 was prepared, except the atomic ratio of K:Fe was 1.4:100 instead of 5.0:100. This catalyst was run at a pressure of 175 psig, a temperature of 270 degrees C., and H2:CO ratio of 0.67, and a space velocity of 10 normal liters/hour/gram iron. Yields are given in Table II.

TABLE II

| Cat B | 175 psig, 270° C. | | SV = 10 sl/h/g-Fe | H2:CO = 0.67 |
|---|---|---|---|---|
| Sample | D | E | F | average |
| $C_1$ | 11.42 | 9.56 | 12.00 | 11.0 |
| $C_2$ to $C_4$ | 36.78 | 28.10 | 35.02 | 33.3 |
| $C_5$ to $C_{11}$ | 41.27 | 42.05 | 37.28 | 40.2 |
| $C_{12}$ to $C_{18}$ | 9.88 | 8.37 | 14.27 | 10.8 |
| $C_{19+}$ | 0.66 | 11.92 | 1.43 | 4.7 |
| | | | Sum | 100.00 |

Yields (Wt %) in FT Synthesis

Figure 3:
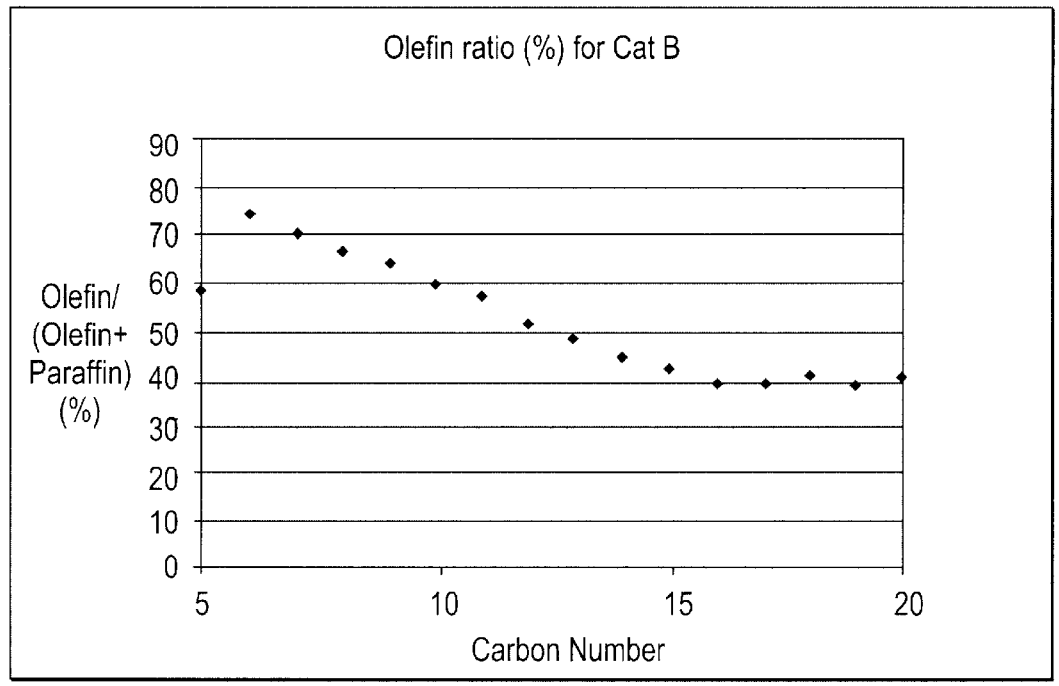
FIG. 3 is a graph illustrating a catalyst having a lower atomic ratio of potassium to iron than the catalyst of FIG. 2.

In comparing the yield of $C_{12}$ to $C_{18}$ hydrocarbons, it should be noticed that Cat B yielded less than 11 weight percent (average) while Cat A under the conditions of Example 1 yielded better than 37 weight percent. Olefinicity as a function of carbon number in the $C_5$–$C_{20}$ range, as calculated from gas chromatography, is shown in FIG. 3. In comparing the olefinicity of the $C_{12}$ to $C_{18}$ products from Cat A as shown in FIG. 2 and Cat B as shown in FIG. 3, it is important to recognize the significant difference in yield between the two catalysts. Although the olefincity of the diesel product produced at 270 degrees C. by Cat B is comparable to that produced by Cat A, the yield of olefins in the boiling range of diesel is significantly less for Cat B. Also note that Cat B produces almost twice as much methane (11 wt. %), a waste product, as compared to Cat A (6.2 wt. %).

Examples 4–7

Figure 4:
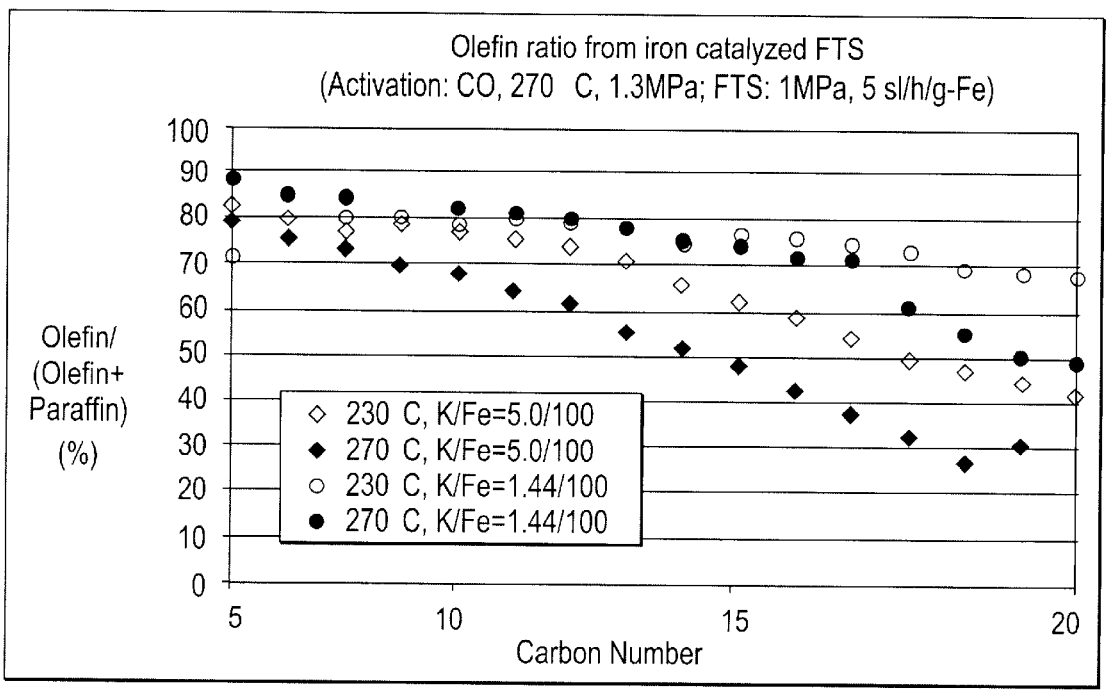
FIG. 4 is a graph illustrating the olefincity of produced using two different catalysts under two different temperatures.

Catalysts Cat A (atomic ratio K/Fe=5.01100) and Cat B (atomic ratio K/Fe=1.4/100) were run at 1 Mpa pressure 5 sl/h/g-Fe space velocity, with each at both 230 degrees C. and 270 degrees C. Olefinicity for these runs is shown in FIG. 4. Although product boiling in the diesel range produced using Cat B display slightly higher olefinicity than that of Cat A, it must be remembered that the yield of diesel using Cat A is about twice that of diesel produced using Cat B.

Example 8

A Slurry Bubble Column Reactor apparatus was constructed with a bubble column having a 5.08 cm diameter and a 2 m height with an effective reactor volume of 3.7 liters. The synthesis gas was passed continuously through the reactor and distributed by a sparger near the bottom of the reactor vessel. The product gas and slurry exited the top of the reactor and passed through an overhead receiver vessel where the slurry was disengaged from the gas-phase. Vapor products and unreacted syngas exited the overhead vessel, entered a warm trap (100 degrees C.), and a cold trap (3 degrees C.). A dry flow meter down stream of the cold trap was used to measure the exit gas flow rate.

A dip tube was added to the reactor vessel so that the F-T catalyst slurry could be recycled internally via a natural convection loop. The unreacted syngas, F-T products, and slurry exited into a side port near the top of the reactor vessel and entered a riser tube. Filtration of the heavy wax products was accomplished by a sintered metal filter tube located in the liquid down-comer circuit. The filter unit was a flow-through device having a sintered metal tube in a shell. Filtered wax was extracted radially through the tube while slurry flows downward in the axial direction. Filtered wax was metered into a storage tank through a let-down valve operated by the overhead liquid level controller. Pressure drop across the filter media was varied manually by varying the wax storage tank pressure. The level or volume of the slurry within the receiver was continuously monitored by measuring the differential pressure across the height of the vessel. Argon was purged through each of the pressure legs to keep the lines free of slurry. Slurry volume within the receiver was controlled to be no more than 1.3 liters by removing wax from the reactor system via the level control valve. The unfiltered slurry flowed back to the reactor via a natural convection loop through a dip-tube exiting near the bottom of a reactor.

A catalyst, labeled Cat C, was prepared similar to that of Example 1, except that the molar ratios were:

Fe/K/Cu/Si=100/5.0/2.0/5.1.

Figure 5:
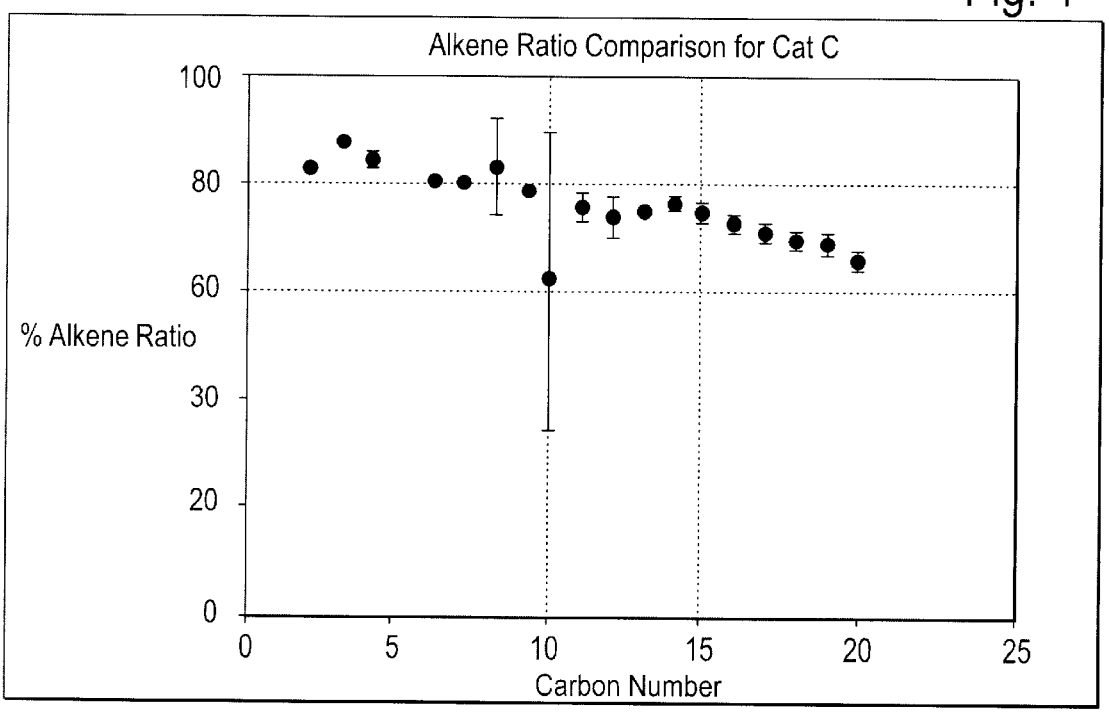
FIG. 5 illustrates % olefinicity by the carbon number of the molecule.

A graph of olefinicity as a function of carbon number is shown in FIG. 5. note that under the conditions of this example the olefinicity of hydrocarbons in the boiling range of diesel are in the range of 70% or above. Hydrocarbons boiling in the range of naphtha are in the range of 80% or more.

What is claimed is:

1. A process for increasing the average molecular weight of the product from a Fischer-Tropsch unit comprising:
   (a) contacting a synthesis gas feed stock in a slurry-type Fischer-Tropsch reaction zone with a potassium promoted iron catalyst under slurry-type Fischer-Tropsch reaction conditions, wherein the atomic ratio of iron to potassium in the catalyst is within the range of from about 100 atoms of iron to 3 atoms of potassium to about 100 atoms of iron to 15 atoms of potassium;
   (b) recovering from the Fischer-Tropsch reaction zone a $C_5$ to $C_{19}$ Fischer-Tropsch product having an olefinicity of at least about 60 weight percent; and (c) oligomerizing under oligomerization conditions at least a portion of the $C_5$ to $C_{19}$ Fischer-Tropsch product and recovering a oligomerization product from the olgomerization reaction zone having an average molecular weight that is at least 10 percent higher than the $C_{19}$ minus Fischer-Tropsch product.

2. The process of claim 1 wherein the $C_5$ to $C_{19}$ Fischer-Tropsch product comprises hydrocarbons boiling within the range of diesel.

3. The process of claim 2 wherein diesel recovered from the Fischer-Tropsch reaction-zone has an olefinicity of at least about 65 weight percent.

4. The process of claim 3 wherein diesel product recovered from the Fischer-Tropsch reaction zone has an olefinicity of at least about 70 weight percent.

5. The process of claim 1 wherein the oligomerization product has an average molecular weight at least 20 percent higher than the $C_5$ to $C_{19}$ Fischer-Tropsch product.

6. The process of claim 1 wherein the oligomerization product comprises a $C_{20}$ plus hydrocarbon.

7. The process of claim 1 wherein the reaction conditions in the Fischer-Tropsch reaction zone include a temperature of between about 200 degrees C. and about 300 degrees C., a pressure of between about 100 psig and about 400 psig and a iron catalyst space velocity between about 2 L/gr/hr and about 20 L/gr/hr.

8. The process of claim 7 wherein the reaction conditions in the Fischer-Tropsch reaction zone include a temperature of between about 210 degrees C. and about 250 degrees C., a pressure of between about 170 psig and about 300 psig and a iron catalyst space velocity between about 3 L/gr/hr and about 7 L/gr/hr.

9. The process of claim 1 wherein the ratio of hydrogen to carbon monoxide in the synthesis gas feed stock is within the range of from about 0.5 volume percent to about 2.5 volume percent.

10. The process of claim 9 wherein the ratio of hydrogen to carbon monoxide in the synthesis gas feed stock is within the range of from about 0.5 volume percent to about 1.0 volume percent.

11. The process of claim 1 wherein the atomic ratio iron to potassium in the catalyst is within the range of from about 100 atoms of iron to 3 atoms of potassium and about 100 atoms of iron to 7 atoms of potassium.

12. The process of claim 1 wherein the catalyst further contains from about 0.1 to about 3 atoms of copper per 100 atoms of iron.

13. The process of claim 1 wherein the catalyst further contains from about 1 to about 10 atoms of silicon per 100 atoms of iron.

14. The process of claim 1 wherein $C_5$ to $C_{19}$ Fischer-Tropsch product recovered from the Fischer-Tropsch reaction zone contains less than about 5 weight percent of aromatics.

15. The process of claim 1 wherein $C_5$ to $C_{19}$ Fischer-Tropsch product recovered from the Fischer-Tropsch reaction zone contains less than about 3 weight percent of aromatics.

16. A method for increasing the olefinicity of a $C_5$ to $C_{19}$ Fischer-Tropsch product which comprises:

(a) contacting a synthesis gas feed stock in a slurry-type Fischer-Tropsch reaction zone with a potassium promoted iron catalyst under slurry-type Fischer-Tropsch reaction conditions, wherein the atomic ratio of iron to potassium in the catalyst is within the range of from about 100 atoms of iron to 3 atoms of potassium to about 100 atoms of iron to 15 atoms of potassium; and (b) recovering from the Fischer-Tropsch reaction zone a $C_5$ to $C_{19}$ Fischer-Tropsch product having an olefinicity of at least about 60 percent.

17. The process of claim 16 wherein the $C_5$ to $C_{19}$ Fischer-Tropsch product comprises hydrocarbons boiling within the range of diesel.

18. The method of claim 17 wherein the diesel recovered from the Fischer-Tropsch reaction zone has an olefinicity of at least about 65 percent.

19. The method of claim 18 wherein the diesel recovered from the Fischer-Tropsch reaction zone has an olefinicity of at least about 70 percent.

20. The method of claim 16 wherein the reaction conditions in the Fischer-Tropsch reaction zone include a temperature of between about 200 degrees C. and about 300 degrees C., a pressure of between about 100 psig and about 400 psig and a iron catalyst space velocity between about 2 L/gr/hr and about 20 L/gr/hr.

21. The method of claim 20 wherein the reaction conditions in the Fischer-Tropsch reaction zone include a temperature of between about 210 degrees C. and about 250 degrees C., a pressure of between about 170 psig and about 300 psig and a iron catalyst space velocity between about 3 L/gr/hr and about 7 L/gr/hr.

22. The method of claim 16 wherein the ratio of hydrogen to carbon monoxide in the synthesis gas feed stock is within the range of from about 0.5 volume percent to about 2.5 volume percent.

23. The method of claim 22 wherein the ratio of hydrogen to carbon monoxide in the synthesis gas feed stock is within the range of from about 0.5 volume percent to about 1.0 volume percent.

24. The method of claim 16 wherein the atomic ratio iron to potassium in the catalyst is within the range of from about 100 atoms of iron to 3 atoms of potassium and about 100 atoms of iron to 7 atoms of potassium.

25. The process of claim 16 wherein $C_5$ to $C_{19}$ Fischer-Tropsch product recovered from the Fischer-Tropsch reaction zone contains less than about 5 weight percent of aromatics.

26. The process of claim 16 wherein $C_5$ to $C_{19}$ Fischer-Tropsch product recovered from the Fischer-Tropsch reaction zone contains less than about 3 weight percent of aromatics.

* * * * *